United States Patent [19]

Nagano

[11] Patent Number: 5,192,249
[45] Date of Patent: Mar. 9, 1993

[54] MULTI-STAGE SPROCKET ASSEMBLY FOR BICYCLE

[75] Inventor: Masashi Nagano, Izumi, Japan

[73] Assignee: Shimano, Inc., Osaka, Japan

[21] Appl. No.: 660,942

[22] Filed: Feb. 26, 1991

[30] Foreign Application Priority Data

Feb. 28, 1990 [JP] Japan .................................. 2-50150
Feb. 28, 1990 [JP] Japan .................................. 2-50151

[51] Int. Cl.⁵ .............................................. F16H 55/30
[52] U.S. Cl. ..................................... 474/160; 474/164
[58] Field of Search .............. 474/152, 158, 160, 164

[56] References Cited

U.S. PATENT DOCUMENTS

| | | | |
|---|---|---|---|
| 3,956,943 | 5/1976 | Yamasaki | 474/160 X |
| 4,348,200 | 9/1982 | Terada | 474/160 |
| 4,773,893 | 9/1988 | Su et al. | 474/160 X |
| 4,889,521 | 12/1989 | Nagano | 474/164 |
| 5,066,264 | 11/1991 | Romano | 474/152 |
| 5,085,620 | 2/1992 | Nagano | 474/152 |
| 5,085,621 | 2/1992 | Nagano | 474/160 |
| 5,087,226 | 2/1992 | Nagano | 474/160 |

FOREIGN PATENT DOCUMENTS

| | | |
|---|---|---|
| 0313345 | 4/1989 | European Pat. Off. |
| 2469624 | 5/1981 | France . |
| 56-2365 | 1/1981 | Japan . |
| 56-3230 | 1/1981 | Japan . |
| 2005363 | 4/1979 | United Kingdom . |

*Primary Examiner*—Ramon S. Britts
*Assistant Examiner*—Roger J. Schoeppel
*Attorney, Agent, or Firm*—Dickstein, Shapiro & Morin

[57] ABSTRACT

A multi-stage sprocket assembly for a bicycle is disclosed. In the assembly, a concave portion is provided in a small-sprocket-side face of a large sprocket for avoiding interference with a drive chain disengaged from a height-reduced tooth of the large sprocket, such that a link-connecting portion of the chain is received at a dedendum or a stepped portion of the large sprocket. Teeth of the small sprocket is phase-arranged with the receiving portion of the large sprocket such that a portion of the chain extending substantially straight rearwardly in a drive rotation direction of the sprocket assembly from the link-connecting portion of the chain received by the receiving portion of the large sprocket is engageable with a tooth of the small sprocket. The stepped portion receives the link-connecting portion at a position lower than the dedendum.

14 Claims, 6 Drawing Sheets

MULTI-STAGE SPROCKET ASSEMBLY FOR BICYCLE

BACKGROUND OF THE INVENTION

1. Field of the Invention

The present invention relates to a multi-stage sprocket assembly for a bicycle where a drive chain is shifted from a larger sprocket to a smaller sprocket.

2. Description of the Prior Art

According to a conventional multi-sprocket assembly, disclosed in e.g. a Japanese published patent gazette No. 56-3230, the large sprocket of the assembly includes a disengagement-facilitating means for facilitating disengagement of the drive chain from teeth of this large sprocket when the drive chain is shifted from the large sprocket to the small sprocket to change a driving speed of the bicycle. Specifically, this disengagement-facilitating means comprises reduction in the height of some of the teeth of the large sprocket relative to the other teeth in order to facilitate the chain disengagement at this portion of the large sprocket.

According to another conventional multi-stage sprocket assembly disclosed in a Japanese published utility model gazette No. 56-3265, the large sprocket has, in its face facing the small sprocket, a concavity to form a stepped portion for receiving the shifting drive chain when the chain is shifted from this large sprocket to the small sprocket disposed adjacent thereto. Specifically, this stepped portion is provided at a position higher than the dedendum of the teeth of the large sprocket so as to avoid locking of the shifting chain segment to the large sprocket.

In the course of chain shift from the large sprocket to the small sprocket, the chain may ride on a tooth crest of the small sprocket thus intefering with the chain shift without proper phase arrangement between the teeth of the large and small sprockets.

However, according to the former-mentioned convention, while the chain shift is initiated at the predetermined portion of the small sprocket, the large sprocket has no predetermined portion for reliably receiving this chain segment. Accordingly, there still tends to occur the problem of the chain riding over the tooth crest of the small sprocket, depending on the magnitude of tension acting on the shifting chain segment.

Further, for reliable and smooth chain shift, the sprocket assembly must be provided with proper teeth phase arrangement between the large and small sprocket. On the other hand, according to the latter-mentioned convention, its stepped portion is adapted merely for receiving a lower edge of the chain. Accordingly, even if the disengaging portion of the chain from the large sprocket is displaced only by one pitch amount from its proper phase position relative to the small sprocket, the displacement may cause the problem of the chain riding over the tooth crest of the small sprocket. Therefore, this type of convention suffers significant restriction in the freedom of phase relationship design.

Taking the above-described states of the art into consideration, the primary object of the present invention is to provide an improved multi-stage sprocket assembly for a bicycle which can assure smooth and reliable chain shift action from the large sprocket to the small sprocket.

The secondary object of the invention, in addition to the primary object, is to provide the assembly with greater freedom in designing of the phase relationship between the large and small sprocket for proper and smooth chain action from the large sprocket to the small sprocket.

SUMMARY OF THE INVENTION

For accomplishing the primary object noted above, a multi-stage sprocket assembly, according to the present invention, comprises: a larger sprocket and a smaller sprocket disposed adjacent to the larger sprocket; disengagement-facilitating means provided to the larger sprocket for facilitating disengagement of a drive chain from teeth of the larger sprocket when the chain is shifted from the larger sprocket to the smaller sprocket; and a concave portion formed in a lateral face of the larger sprocket facing the smaller sprocket, the concave portion being provided for avoiding inteference with the chain disengaged by the disengagement-facilitating means and also for allowing a portion of the larger sprocket to receive a connecting portion of link plates of the chain; teeth of the smaller sprocket being phase-arranged with said portion of the larger sprocket such that a portion of the chain extending substantially straight rearwardly in a drive rotation direction of the sprocket assembly from the connecting portion of the chain received by said portion of the larger sprocket is engageable with a tooth of the smaller sprocket.

According to the above features of the invention, the drive chain is positively disengageable by means of the disengagement-facilitating means from the larger sprocket at the predetermined portion. Further, this disengaged chain segment is brought adjacent to the smaller-sprocket-side lateral face of the larger sprocket with the aid of the concave portion and the one linkplate connecting portion of the chain segment at a portion of the larger sprocket. Therefore, the connecting portion to be received by the larger sprocket portion is predetermined irrelevant to tension acting on the chain segment. Moreover, since the teeth of the smaller sprocket are phase-arranged with said portion of the larger sprocket such that a portion of the chain extending substantially straight rearwardly in a drive rotation direction of the sprocket assembly from said connecting portion of the chain received by the portion of the larger sprocket is engageable with a tooth of the smaller sprocket, there is no problem with the chain riding over a tooth crest of the smaller sprocket. In these manners, the invention has achieved the first object of providing an improved multi-stage sprocket assembly for a bicycle which can assure smooth and reliable chain shift action from the large sprocket to the small sprocket.

According to a second characterizing feature of the present invention, in addition to the above-described first characterizing features, a lower edge of the link-plate connecting portion of the chain received by the portion of the larger sprocket is positioned lower a dedendum of the teeth of the larger sprocket.

With this second characterizing feature, as compared with the construction of the first characterizing features, the link-plate connecting portion of the chain can be received at a position even closer to the smaller sprocket, thus stabilizing the posture of the entire chain segment extending towards the smaller sprocket. Consequently, the construction having this second feature can achieve effects of the first feature construction even more conspicuously.

According to a third characterizing feature of the present invention, in addition to either the first or second features described above, said concave portion is provided to a link plate disengaged from a tooth of the larger sprocket and positioned adjacent the smaller-sprocket-side face of the larger sprocket and to a further link plate positioned immediately rearward relative to said link plate in the drive rotation direction of the sprocket assembly.

With the above third characterizing feature of the invention, it becomes possible to maximize an approaching amount of the disengagement-leading link plate relative to the smaller-sprocket-side face of the larger sprocket, whereby the link-plate connecting portion may be more reliably received. This construction has another advantage of more effectively avoiding intereference between the chain and the smaller-sprocket-side face of the larger sprocket.

For achieving the second object, according to a fourth characterizing feature of the present invention, in the sprocket assembly construction where the concave portion is provided to the smaller-sprocket-side face of the larger sprocket for avoiding interference with the chain when the drive chain is shifted from the larger sprocket to the smaller sprocket, the concave portion includes a receiver portion for receiving a lower edge of a link plate disengaged from a tooth of the larger sprocket and positioned adjacent the smaller-sprocket-side face of the larger sprocket and also for determining a posture of said link plate relative to a radial direction of the sprocket assembly.

With this fourth characterizing feature of the invention, the receiver portion determines the posture of the link plate relative to the radial direction of the sprocket assembly. Then, by forming this receiver portion for appropriately determining the posture of the link plate, it is possible to vary the relationship between the teeth of the small sprocket and the chain to engage these teeth without having to vary the phase relationship between the larger and smaller sprockets. As a result, the construction with this feature can provide greater freedom in the designing of the phase relationship between the sprockets so that the chain segment disengaged from the larger sprocket may properly engage with the teeth of the smaller sprocket. In short, the construction permits smoother chain shift or increase in the area where the smooth chain shift is possible.

According to a fifth characterizing feature of the invention, in addition to the fourth feature, the receiver portion is capable of receiving a second link plate positioned immediately rearward relative to the disengagement-leading link plate in the drive rotation direction of the sprocket assembly.

With this fifth feature, since the second link plate usually comprises an outer plate having a greater width than an inner plate and since this entire outer link is brought into opposition to the larger sprocket, it is possible to increase the area of the receiver portion for receiving the chain segment and the receiver portion having this increased area can more reliably receive the chain and also determine its posture.

Incidentally, in embodying the present invention, it is conceivable to provide the first through third features at two portions of the larger sprocket with the two portions being displaced by one pitch amount relative to each other so that the larger sprocket receives the connecting portion of the chain at two different heights different by one pitch amount relative to each other.

Then, the above-described effects of these features can be reliably achieved regardless of the relationship between the narrow inner plates of the chain and the teeth of the larger sprocket. That is, at either position, smooth chain shift action is possible without the chain riding over the tooth crest of the smaller sprocket. Therefore, this arrangement can provide even greater freedom in the assembly design. Similarly, it is also conceivable to provide the fourth or fifth characterizing feature at two portions of the large sprocket with one pitch amount displacement therebetween. Or, it is further possible to embody the disengagement-facilitating means such that a first reference tooth of the larger sprocket corresponding to the first disengagement-leading link plate relating to the third feature of the invention is one-pitch amount displaced from a second reference tooth of the larger sprocket corresponding to the first disengagement-leading link plate relating to the fourth feature of the invention.

Further and other objects, features and effects of the invention will become more apparent from the following more detailed description of the embodiments of the invention with reference to the accompanying drawings.

BRIEF DESCRIPTION OF THE DRAWINGS

Accompanying drawings illustrate a multi-stage sprocket assembly for a bicycle relating to one preferred embodiment of the present invention; in which.

DESCRIPTION OF THE PREFERRED EMBODIMENTS

Preferred embodiments of a multi-stage sprocket assembly for a bicycle relating to the present invention will now be described in particular with reference to the accompanying drawings.

Figure 1:
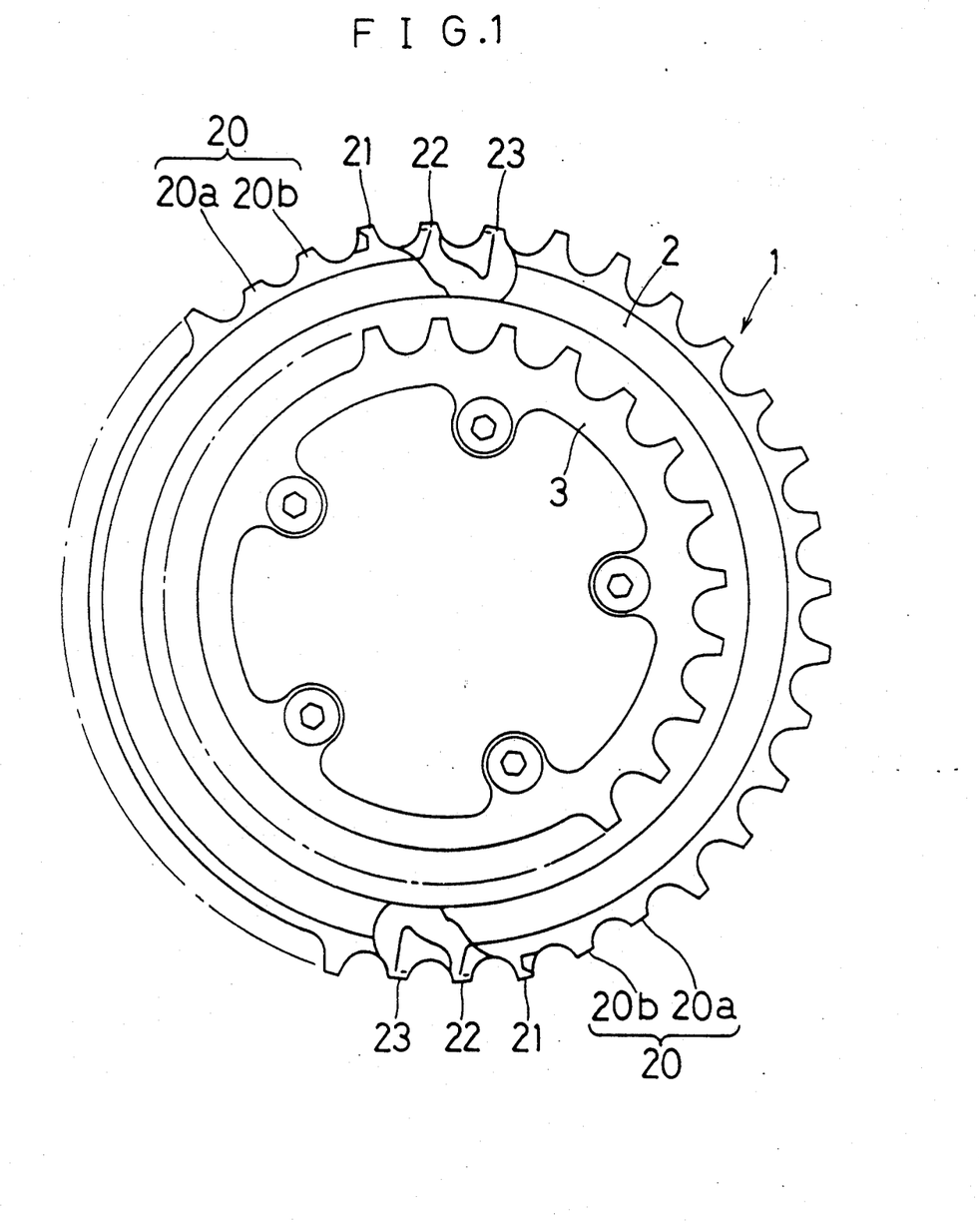
FIG. 1 is a side view of the sprocket assembly.

As shown in FIG. 1, a multi-stage sprocket assembly 1 includes a large sprocket 2 and a small sprocket 3 disposed adjacent the large sprocket 2. The large sprocket 2 includes first and second disengagement-facilitating teeth 20a, 20b acting as disengagement-facilitating means 20 for facilitating disengagement of a drive chain at this predetermined portion when the chain is shifted from the large sprocket 2 to the small sprocket 3. This disengagement-facilitating means 20 is provided at two peripheral positions of the large sprocket 2 with 180 degree displacement therebetween where a chain shift should take place because bicycle-driving torque applied to the crank device is minimum there. The second disengagement-facilitating tooth 20b has a greater tooth height than the first disengagement-facilitating tooth 20a; yet, these teeth 20a and 20b have a shorter tooth height than all the other teeth of the large sprocket 2. Further, the three teeth, rearwardly subsequent in a drive rotation direction of the sprocket assembly 1 to the second disengagement-facilitating tooth 20b, will be referred to as a first reference tooth 21, a second reference tooth 22 and a third reference tooth 23, respectively.

Figure 4:
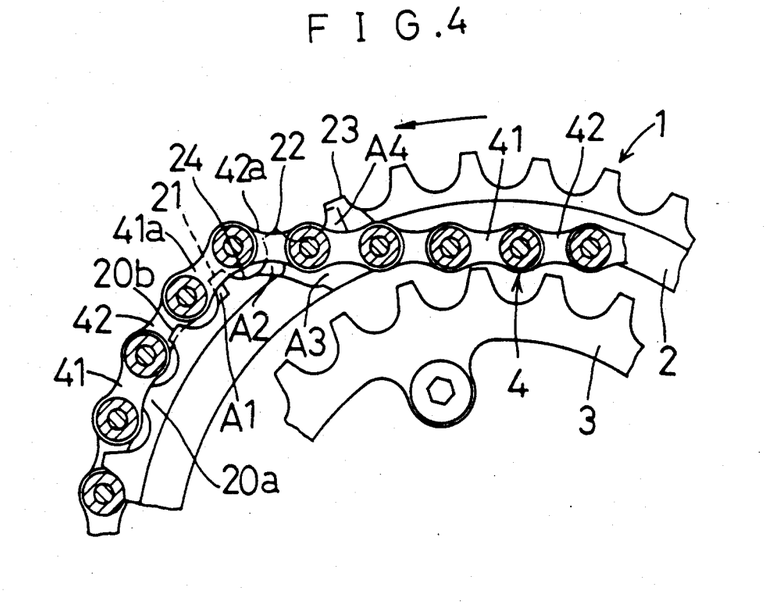
FIG. 4 is a side view illustrating positional relationship between a drive chain and the sprocket assembly under an initial stage of a chain shift operation.
Figure 5:
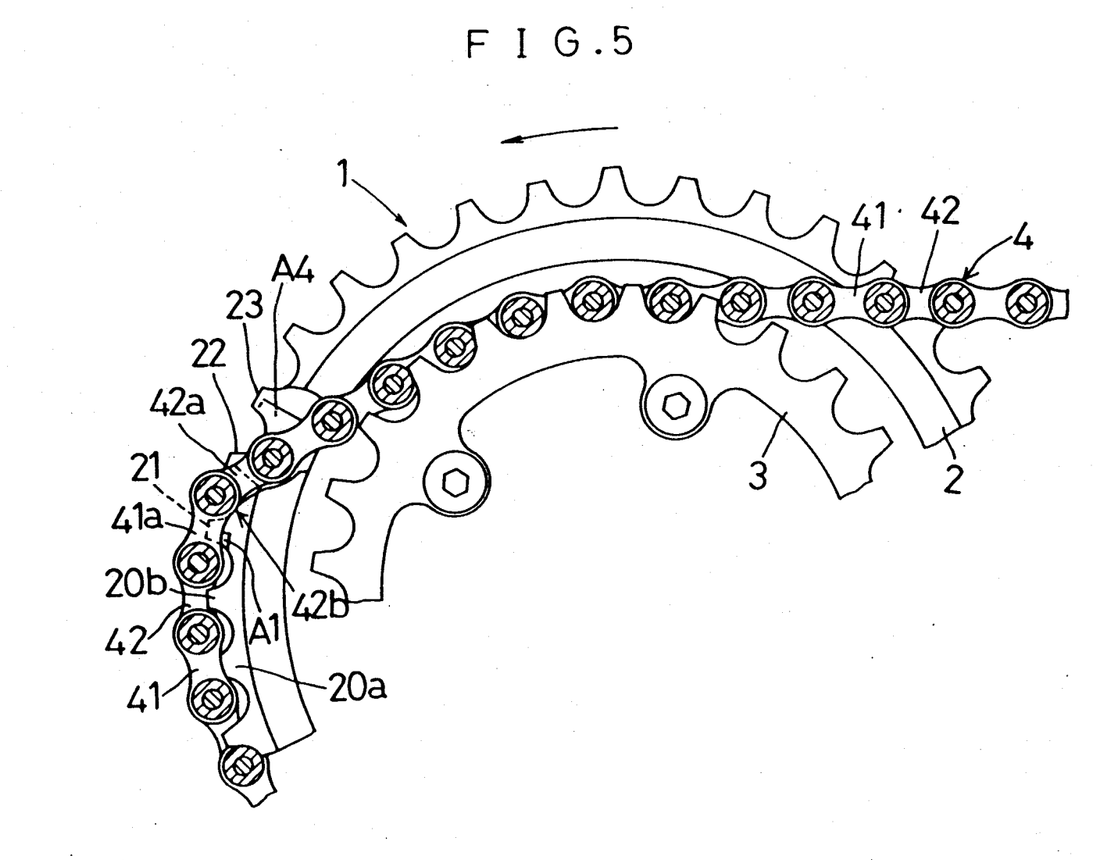
FIG. 5 is a side view illustrating further positional relationship between the drive chain and the sprocket assembly under a final stage of the chain shift operation.
Figure 6A:
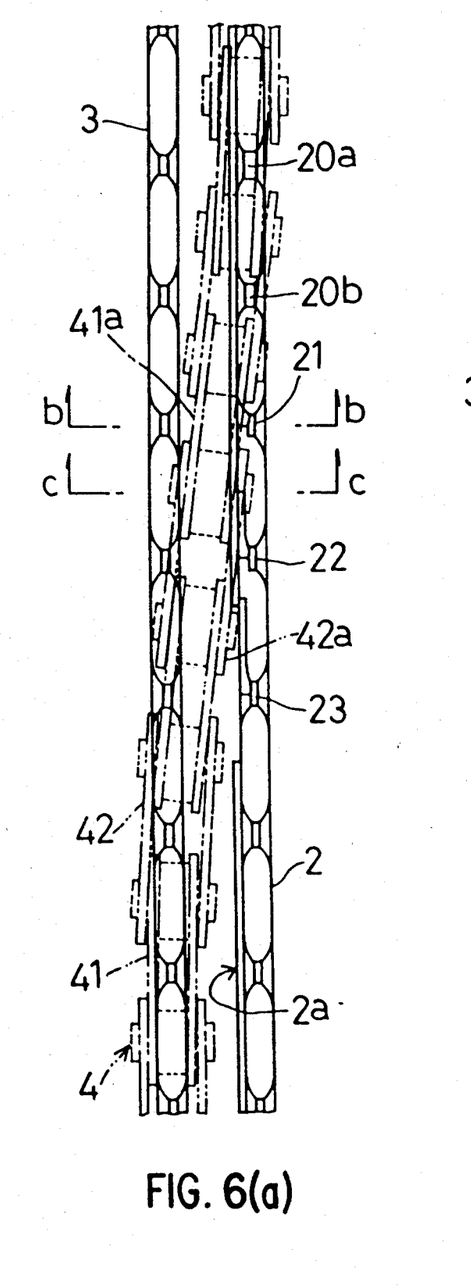
FIG. 6(a) is a plane view corresponding to FIG. 3.
Figure 6B:
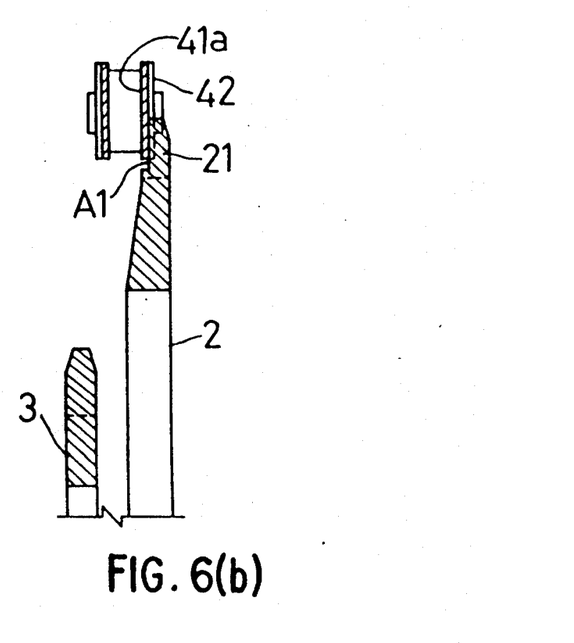
FIG. 6(b) is a section taken along a line b—b of FIG. 3.
Figure 6C:
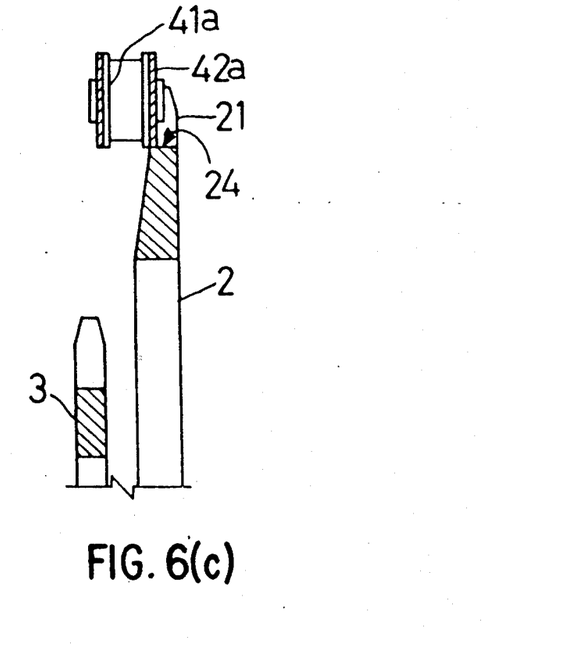
FIG. 6(c) is a section taken along a line c—c of FIG. 3.
Figure 7:
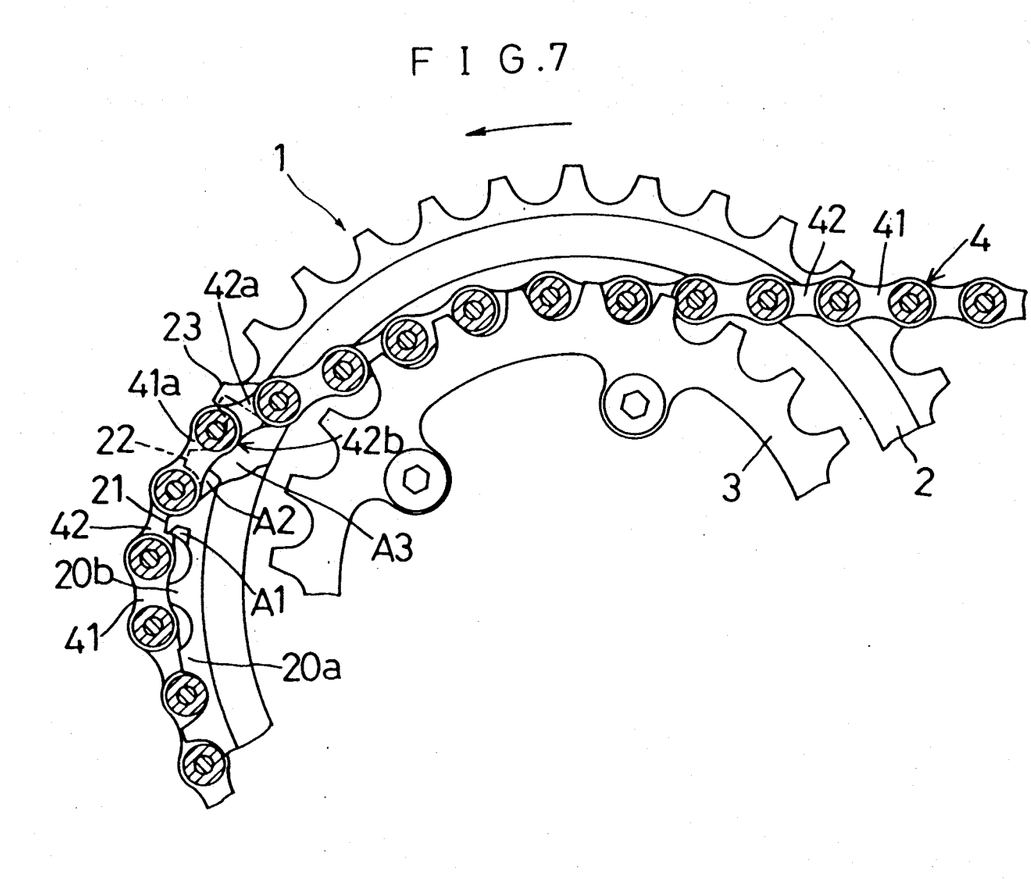
FIG. 7 is a side view corresponding to FIG. 5 where a chain shift operation takes place at a different position than the condition of FIG. 5.

As shown in FIG. 6, the drive chain 4 employed in this particular embodiment, is a roller chain consisting of two kinds of link plates, i.e. narrow inner plates 41 and wide outer plates 42 pivotably and alternately connected to each other. In FIGS. 4, 5 and 7, the inner and outer link plates 41 and 42 on the immediate side are eliminated from the views.

Figure 2:
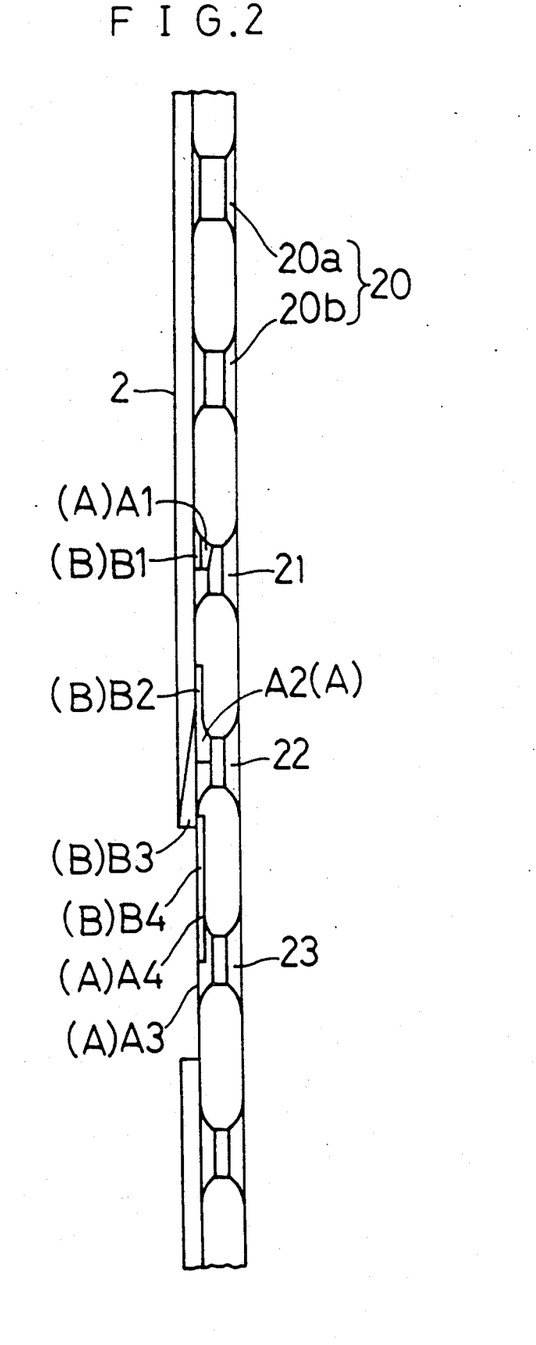
FIG. 2 is a plane view of a large sprocket of the assembly.
Figure 3:
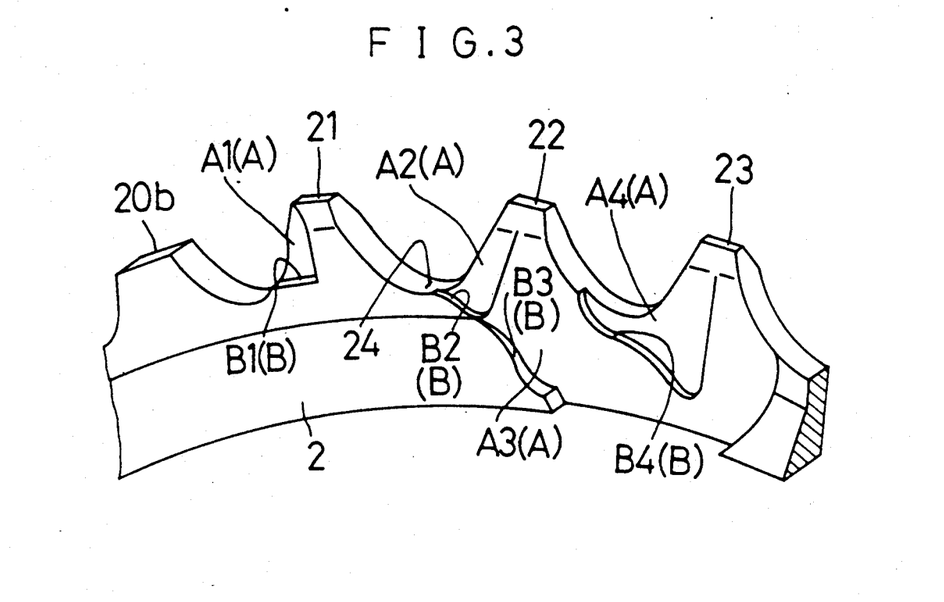
FIG. 3 is an enlarged perspective view showing vicinity of predetermined teeth of the large sprocket.

As shown in FIGS. 1 through 3, the first reference tooth 21, forwardly in the drive rotation direction and on the side facing the small sprocket 3, forms a first cutout face A1 as an example of a concave portion A of the invention. The second reference tooth 22 forms a second cutout face A2 extending beyond the root of this tooth 22. Further, a third cutout face A3 is formed by cutting out, in the thickness of the large sprocket 2, a rear lower portion relative to the second cutout face A2. Furthermore, a fourth cutout face A4 is formed ajacent a dedendum between the second reference tooth 22 and the third reference tooth 23. These first through fourth reference teeth A1 through A4 function to allow a chain segment disengaged from the small sprocket 3 to approach the large sprocket 2, such that a connecting portion of link plates of the translating chain segment is received either at a reference dedendum 24 between the first and second reference teeth 21, 22 or a fourth stepped portion B4 below the fourth cutout face A4. The second and fourth cutout faces A2 and A4 have greater cutting depths than the third cutout face A3. Also, the first through third cutout faces A1 through A3 respectively have, at lower regions thereof, first through third stepped portions B1 through B3 for avoiding interference with a lower edge of the translating chain segment.

The small sprocket 3 has its teeth phase-arranged relative to the reference dedendum 24 of the large sprocket 2 such that the chain shift between these sprockets 2, 3 can take place smoothly without the chain 4 riding over a tooth crest of the small sprocket 3. Moreover, the fourth stepped portion B4 is so formed as to receive a lower edge of the connecting portion of a disengagement-leading outer plate (to be detailed later) at a position lower than the reference dedendum 24, i.e. at a position closer relative to a rotational axis of the sprocket assembly 1. With this, the chain segment can smoothly engage with a tooth of the small sprocket 3 even if the engagement relationship relative to the large sprocket is displaced by one pitch amount.

Next, the functions of these cutout faces A1 through A4 and the stepped portions B1 through B4 in the course of a change-speed shifting operation of the drive chain 4 will be particularly described.

A first case is illustrated in FIG. 4 in which an inner plate 41 of the shifting chain segment comes into correspondence with the first disengagement-facilitating tooth 20a. With a rider's operation of an unillustrated derailleur, the chain 4 currently engaging the large sprocket 2 is laterally displaced toward the small sprocket 3. Then, the inner plate 41 of this displaced chain 4 rides over the first disengagement-facilitating tooth 20a and the outer plate 42 subsequent to the inner plate 41 engages the second disengagement-facilitating tooth 20b. Also, the next inner plate 41a first disengages from a tooth of the large sprocket 2 and moves to a small-sprocket-side face 21a of the first reference tooth 21. This first disengaging inner plate 41a will be referred to as a disengagement-leading inner plate. Similarly, the outer plate 42a next to the disengagement-leading inner plate in the drive rotation direction will be referred to as the disengagement-leading outer plate.

In this condition, the chain 4 is laterally flexed; and with further rotation of the sprocket assembly 1, the disengagement-leading inner plate 41a moves downward to a position substantially overlapping sidewisely with the first reference tooth 21, so that the subsequent plate portion of the chain 4 comes into engagement with the small sprocket 3 as illustrated in FIGS. 5 and 6(a). In this condition, as illustrated in FIG. 6(b), an outer side face, facing the large sprocket 2, of the disengagement-leading inner plate 41a substantially comes adjacent or into abutment against a side face of the first reference tooth 21. This outer side face, as described hereinbefore, corresponds to the first cutout face A1. Therefore, according to this invention's construction, compared with the convention, the construction provides the widthwise clearance determined by the cutting depth of this cutout face A1 for restricting an amount of the flexion of the chain 4.

Further, since the second reference tooth 22 is provided with the second cutout face A2, the disengagement-leading outer plate 42a can move very close to the small-sprocket-side face 2a of the large sprocket 2. Then, as illustrated in FIG. 6(c), a lower edge 42b of the connecting portion between the disengagement-leading inner plate 41a and the disengagement-leading outer plate 42a comes into engagement with the reference dedendum 24 between the first reference tooth 21 and the second reference tooth 22 such that the disengagement-leading outer plate 42a is maintained at such a position as being pivotable about the reference dedendum 24 as illustrated in FIGS. 4 and 5. For this reason, the chain portion 4 subsequent to the lower edge connecting portion 42b can extend substantially straight for coming into smooth engagement with the small sprocket 3, regardless of the magnitude of tension currently acting on the chain 4.

In the course of the above, since the lower edge connecting portion 42b of the chain 4 is received at the position very close to the tooth of the small sprocket 2, the entire chain segment 4 extending to the small sprocket 2 can maintain a stable posture.

The aforementioned third cutout face A3 is provided for avoiding interference with the disengagement-leading outer plate 42a and the subsequent chain portion 4. Further, the first and second cutout faces A1 and A2 respectively come into face contact with the disengagement-leading inner and outer plates 41a, 42a, thereby determining the angle of inclination of the chain 4 relative to the rotational axis of the sprocket assembly 1. Incidentally, the second cutout face A2 can function particularly effectively for this type of chain 4 having the wide outer plates 42 which would readily interfere with the small-sprocket-side face 2a of the large sprocket 2 without this second cutout face A2.

FIG. 7 shows a second case where the inner plate 41 corresponds to and rides over the second disengagement-facilitating tooth 20b. In this case, the second cutout face A2 functions like the first cutout face A1 in the former-described case. Further, the second cutout face A2 functions substantially similarly to the fourth cutout face A4. Also, the fourth stepped portion B4 receives the lower edge connecting portion 42b at a position lower than the reference dedendum 24. Therefore, in this case, the length of the translating chain segment 4 is reduced relative to the case shown in FIG. 4. Consequently, in spite of the teeth phase arrangment of the small sprocket 3 determined relative to the reference dedendum 24, the chain portion 4 subsequent to the disengagement-leading outer plate 42a received at the fourth stepped portion B4 can also extend substantially straight for coming into smooth engagement with the small sprocket 3. Also, because of the reduced length of the translating chain segment 4, the construction can achieve speedy chain shift operation.

Some other embodiments of the invention will be specifically described next.

In the construction of the foregoing embodiment, the lower edge connecting portion 42b is received at the reference dedendum 24 or at the fourth stepped portion B4 and this determines the distance between the lower edge connecting portion 42b and the rotational axis of the sprocket assembly 1 and determines consequently the tooth phase arrangement of the small sprocket 3. Instead, it is conceivable to alternately construct the second through fourth stepped portions B2 through B4 to support the lower edge of the disengagement-leading outer plate 42a including the lower edge connecting portion 42b. With this, these stepped portions B2 through B4 function not only for the determination of the distance but also as a receiver portion for determining the posture of the disengagement-leading outer plate 42a relative to the diameter of the sprocket assembly 1, i.e. the pivot angle of the position corresponding to the lower edge connecting portion 42b about the chain connecting pin. For instance, in FIG. 5, if the second and third stepped portions B2 and B3 function to correct the posture of the disengagement-leading outer plate 42a such that the plate 42a is brought into parallel with a tangent to the outer periphery of the large sprocket 2; then, it becomes possible to displace the subsequent chain portion 4 more forwardly in the drive rotation direction than the corresponding tooth of the small sprocket 3. Incidentally, the substantially straight extending posture of the chain portion 4 subsequent to the lower edge connecting portion 42b is understood to include such posture of this chain portion 4 slightly flexed by the receiver portion when the posture correction amount of the receiver portion is rather limited.

In the foregoing embodiment, when the inner plate 41 corresponds to the first disengagement-facilitating tooth 20a, the connecting portion of the chain is received at the reference dedendum 24 and the subsequent chain portion extends substantially straight therefrom. Instead, it is also conceivable to form larger, e.g. the first through third cutout faces A1 through A3 such that the link-plate connecting portion of the chain 4 is received at the dedendum between the second disengagement-leading tooth 20b and the first reference tooth 21 and the subsequent chain portion extends substantially straight therefrom. In this case, this dedendum between the second disengagement-leading booth 20b and the first reference tooth 21 functions as the reference dedendum. Therefore, this alternate construction has the advantage of further reducing the length of the shifting chain segment.

In the foregoing embodiment, the first cutout face A1 is formed with an inclination relative to the drive rotation direction of the sprocket assembly. Instead, it is also conceivable to cut in the direction of the thickness, the entire small-sprocket-side face of the large sprocket. Further, as illustrated, the first stepped portion B1, provided in combination with the first cutout face A1, can be formed to extend substantially normal to the lowering direction of the shifting chain segment 4 or with a certain inclination relative thereto. Or, it is further conceivable to so form this first stepped portion B1 as to receive the chain 4.

In the above embodiments, the multi-stage sprocket assembly comprises the large and small sprockets 2, 3. However, it is understood that the invention may be embodied as a sprocket assembly comprising more than three sprockets. In such case, the essential elements of the invention should be provided in accordance with the size relationships among these sprockets.

Further, the disengagement-facilitating means comprises the reduced tooth height in the above embodiments. Instead, it is also conceivable to embody this means as any other conventional means such as a cutout portion formed in the other face of the large sprocket 2 opposite to the small sprocket 3, or displacement of a tooth crest of the large sprocket 2 towards the small sprocket 3 or inclination of the tooth crest toward the slanting direction of the chain segment 4.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A multi-stage sprocket assembly comprising:
   a larger diameter sprocket;
   a smaller diameter sprocket adjacent to said larger diameter sprocket;
   disengagement-facilitating means provided on said larger diameter sprocket, said disengagement-facilitating means operating to facilitate the disengagement of a portion of a chain from said larger diameter sprocket when said chain portion is manipulated to shift from said larger diameter sprocket to said smaller diameter sprocket;
   a recessed portion provided on a side face of said larger diameter sprocket facing said smaller diameter sprocket for permitting said chain portion to pass therethrough when said chain portion shifts from said larger diameter sprocket to said smaller diameter sprocket;
   a chain supporting portion provided on said larger diameter sprocket for supporting an outer link plate of said chain portion shifted from said larger diameter sprocket, said chain supporting portion including at least one support face provided on said side face of said larger diameter sprocket for directly contacting with and supporting said chain portion; and
   teeth of said smaller diameter sprocket being provided with a phase arrangement relative to said chain supporting portion such that said shifted chain portion comes into engagement with said teeth of said smaller diameter sprocket while said chain portion extends substantially straight.

2. A multi-stage sprocket assembly according to claim 1, wherein said support face of said chain supporting portion is located radially inwardly from a dedendum line of said larger diameter sprocket.

3. A multi-stage sprocket assembly according to claim 1, wherein said support face of said chain supporting portion extends radially inwardly from a neighborhood of a dedendum line of said large diameter sprocket.

4. A multi-stage sprocket assembly according to claim 3, wherein said recessed portion is provided and arranged so that a first link plate of said chain portion which first disengages from said larger diameter sprocket and a second link plate of said chain portion which follows said first link plate can pass therethrough, and said chain supporting portion supports said first link plate and said second link plate.

5. A multi-stage sprocket assembly according to claim 1, wherein at least a first and second series of elements, each comprising said disengagement-facilitating means, said recessed portion, and said chain supporting portion, are provided on said larger diameter sprocket, said first series and second series of elements being displaced from each other circumferentially of said larger diameter sprocket by one tooth pitch of said larger diameter sprocket.

6. A multi-stage sprocket assembly according to claim 5, wherein said chain supporting portion of said first series is rearwardly of the other elements of said first series in a sprocket rotation direction, said supporting portion of said first series being located in a different position relative to the other elements of said first series than said supporting portion of said second series is to the other elements of said second series.

7. A multi-stage sprocket assembly according to claim 6, wherein said disengagement-facilitating means is a pair of teeth of said larger diameter sprocket which have a shorter tooth height than other teeth of said larger diameter sprocket.

8. A multi-stage sprocket assembly according to claim 7, wherein said chain supporting portion determines an attitude of said chain portion relative to said smaller diameter sprocket.

9. A multi-stage sprocket assembly according to claim 5, wherein said chain supporting portion of said first and second series are arranged such that when said link plate of said chain rides on said disengagement-facilitating means of said first series said chain passes through said recessed portion of said first series, and then said chain is supported on said chain supporting portion of said first series, and when said link plate of said chain rides on said disengagement-facilitating means of said second series said chain passes through said recessed portion of said second series, and then said chain is supported on said chain supporting portion of said second series.

10. A multi-stage sprocket assembly according to claim 1, wherein said disengagement-facilitating means, said recessed portion and said chain supporting portion are arranged in a series in a direction opposite to the rotational direction of said larger diameter sprocket.

11. A multi-stage sprocket assembly according to claim 1, wherein said disengagement-facilitating means is at least one tooth of said larger diameter sprocket which has a shorter tooth height than other teeth of said larger diameter sprocket.

12. A multi-stage sprocket assembly according to claim 1, wherein said chain supporting portion determines an attitude of said chain portion relative to said smaller diameter sprocket.

13. A multi-stage sprocket assembly comprising:
 a larger diameter sprocket;
 a smaller diameter sprocket adjacent to said larger diameter sprocket;
 a recess portion provided on a side face of said larger diameter sprocket facing said smaller diameter sprocket so that a chain portion can pass therethrough when said chain portion shifts from said larger diameter sprocket to said smaller diameter sprocket; and
 a chain supporting portion provided on said larger diameter sprocket, said chain supporting portion supporting an outer link-plate of said chain portion shifted from said larger diameter sprocket and determining an attitude of said chain portion relative to said smaller diameter sprocket, said chain supporting portion including at least one support face provided on said side face of said larger diameter sprocket for directly contacting with and supporting said chain portion.

14. A multi-stage sprocket assembly according to claim 13, wherein said chain supporting portion supports a second link plate of said chain portion which disengages secondly from said larger diameter sprocket after a preceding first link plate of said chain portion disengages.

* * * * *